Patented Nov. 14, 1922.

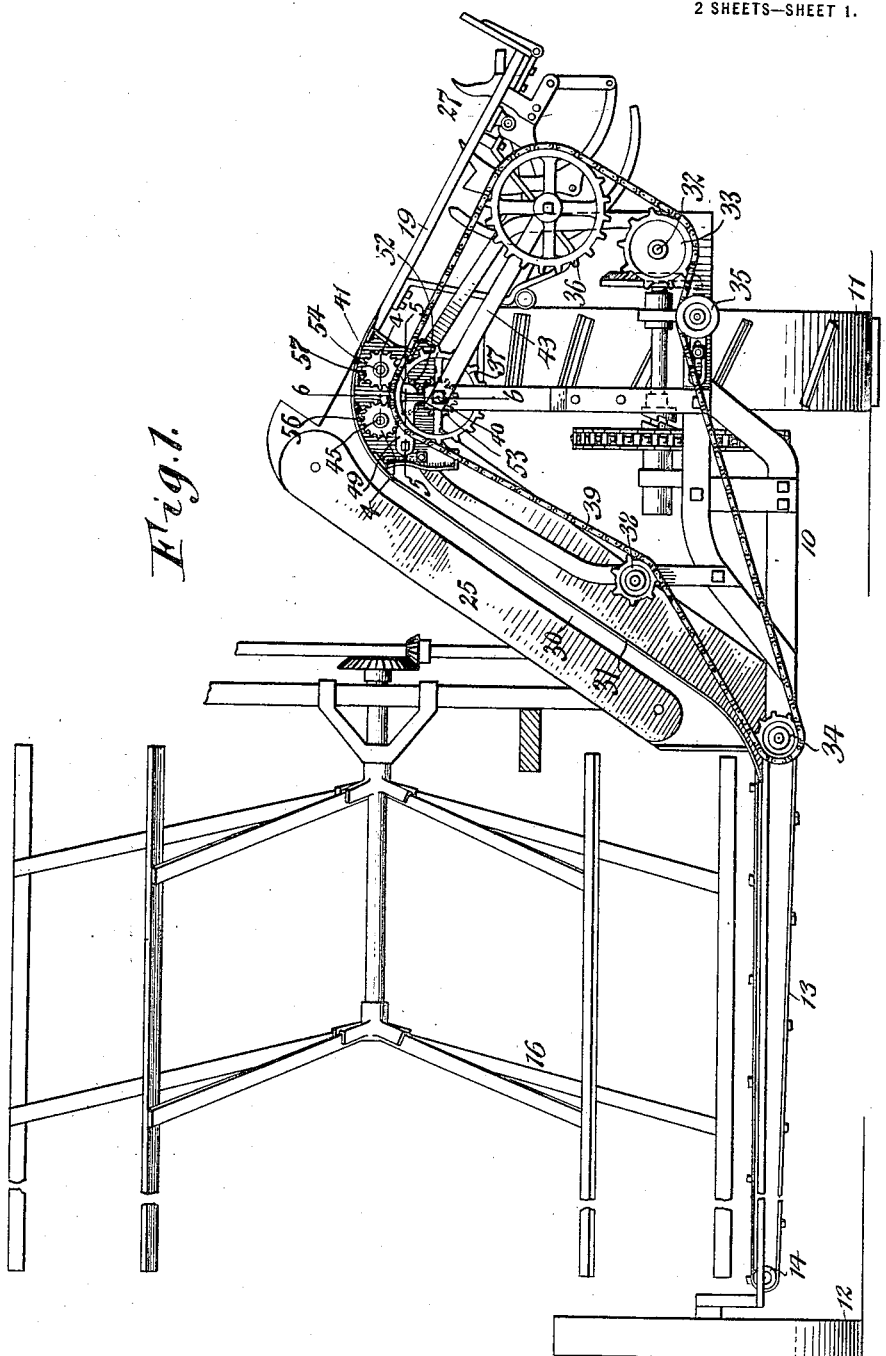

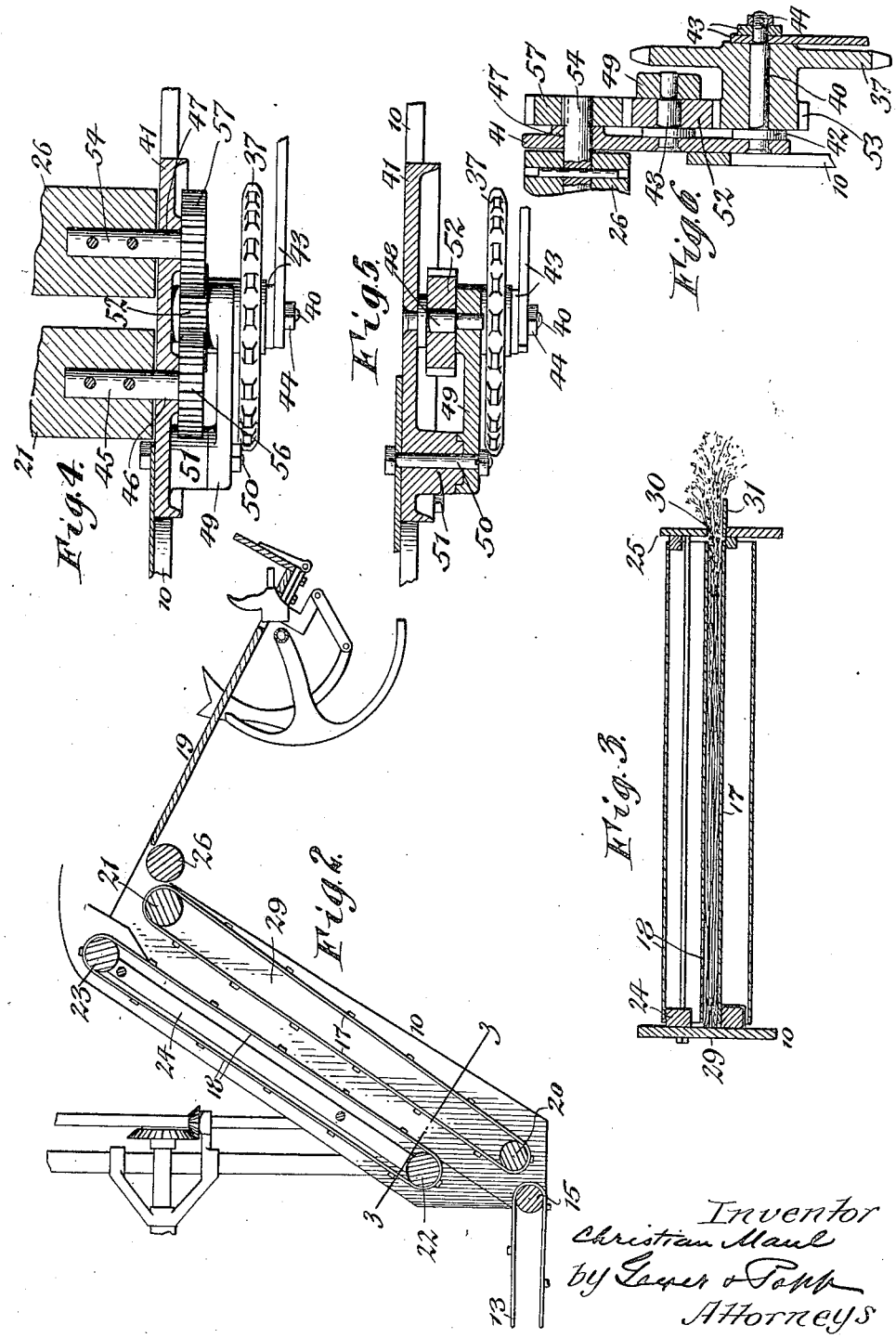

1,435,725

UNITED STATES PATENT OFFICE.

CHRISTIAN MAUL, OF BATAVIA, NEW YORK, ASSIGNOR TO MASSEY-HARRIS HARVESTER COMPANY, INC., OF BATAVIA, NEW YORK, A CORPORATION OF NEW YORK.

GRAIN HARVESTER.

Application filed September 24, 1920. Serial No. 412,458.

*To all whom it may concern:*

Be it known that I, CHRISTIAN MAUL, a citizen of the United States, residing in Batavia, in the county of Genesee and State of New York, have invented new and useful Improvements in Grain Harvesters, of which the following is a specification.

This invention relates to a grain harvester and more particularly to the mechanism for driving the lower apron or belt of the elevator and the clearing roller whereby the grain is carried from the elevator to the binder deck.

It is the object of this invention to provide a driving mechanism for these parts which is wholly out of the path of the grain and therefore not tending to partly thresh the same nor interfere with its progress while being propelled by the aprons of the elevators. A further object of this invention is to so organize this driving mechanism that the use of short chain belts is eliminated and thus avoid undue loss of power and rapid wear of the parts.

In the accompanying drawings:

Figure 1 is a rear elevation, partly in section, of a grain harvester embodying my improvements. Figure 2 is a fragmentary vertical longitudinal section of the same. Figure 3 is a fragmentary vertical cross section thereof taken on line 3—3 Fig. 2. Figures 4 and 5 are fragmentary horizontal sections on an enlarged scale, of the elevator and clearing roller driving mechanism, the sections being taken on lines 4—4 and 5—5, Fig. 1, respectively. Figure 6 is a fragmentary vertical section of the same taken on the correspondingly numbered line in Fig. 1.

Similar characters of reference refer to like parts throughout the several views.

10 represents the main frame of the harvester which may be of any suitable construction to support the several working parts and which is supported on the stubbleward side by a master wheel 11 and on the grainward side by a supporting wheel 12.

On the grainward end of the frame is arranged a horizontal conveyer which receives the grain from the cutter mechanism and delivers the same to the elevator, whereby the grain is elevated over the master wheel and presented to the binder mechanism which ties bands around bundles of the grain. This horizontal conveyer is of usual and well known form and preferably comprises a canvas apron or belt 13 which passes at its grainward and stubbleward turns around supporting rollers 14, 15 journaled on the main frame. This horizontal conveyer moves with its upper operative stretch from the grainward side toward the stubbleward side of the machine and the grain is directed upon the same from the cutter mechanism by the usual rotary reel 16.

The elevator comprises lower and upper inclined canvas aprons or belts 17, 18, which extend upwardly at an angle from the delivery turn of the horizontal conveyer to the upper or receiving end of the downwardly-inclined binder deck 19. The lower elevator apron passes with its lower and upper turns around horizontal receiving and delivery rollers 20, 21, which are journaled transversely on the lower and upper parts of the main frame, this apron being operated to move upwardly with its upper stretch. The upper elevator apron passes with its lower and upper turns around horizontal receiving and delivery rollers 22, 23 which are journaled transversely in two supporting bars or plates 24, 25, arranged transversely and in an inclined position relatively to the main frame at the front and rear sides of the elevator. The lower stretch of the apron moves upwardly, so that the grain discharged from the horizontal conveyer will be received between the opposing stretches of the two elevator aprons and carried upwardly to the binder deck. In passing from the elevator aprons to the deck the grain is engaged by an intermediate clearing roller 26 which is journaled horizontally and transversely on the main frame in the gap between the elevator and the deck.

As the grain slides down the binder deck the same is received by the bundling and tying mechanism 27 which is arranged adjacent to the lower part of the deck and which may be of any suitable construction to tie bands around the bundles of grain which is being harvested.

The space or passageway between the elevator aprons is closed on the front side of this space by the adjacent wall 29 which is mounted on the main frame and which faces the butt ends of the grain, as shown in Fig. 3, while the rear side of this space or passageway is open and forms a gap or throat 30 through which the heads of the grain of varying length project rearwardly therefrom.

Projecting laterally from the main frame on the lower side of the throat 30 is a shield 31 which supports the heads of the grain which overhang rearwardly from the lower elevator apron. This shield is flush or in line with the propelling surface of the lower apron so that the grain can rest fully on this apron and thus obtain the full tractive effect of the same which prevents the heads of the grain from lagging behind and interfering with the most efficient operation of the machine, while at the same time keeping the heads of the grain out of the way from the driving mechanism of this machine which otherwise would tend to partly thresh the head and result in corresponding loss of the crop.

The improved means for driving the lower elevator apron or belt and the clearing roller are constructed as follows:

32 represents one of the driving shafts of the machine which is journaled horizontally and transversely in the lower stubbleward part of the main frame and operatively connected with the master wheel 11 so as to be driven thereby in any suitable or usual manner. This shaft is provided at its rear end with a sprocket wheel 33 and the corresponding end of the delivery roller is provided with a similar sprocket wheel 34. Upon the intermediate part of the main frame is mounted a tightener pulley or wheel 35 which is adjustably secured thereto in any well known manner. 36 represents a sprocket wheel which is mounted on the stubbleward part of the main frame above the sprocket wheel 33; 37 is a sprocket wheel mounted on the upper rear part of the main frame so that its axis is below the axes of the rollers 21, 26; and 38 is an intermediate sprocket wheel mounted on the main frame intermediately of the wheels 34 and 37 and underneath the shield 31. 39 is a chain belt passing around the sprocket wheels 32, 34, 36, 37 and 38 and the tightener wheel 35. The sprocket wheel 37 is journaled on a lower horizontal arbor 40 which projects laterally from a bracket 41 forming part of the upper end of the main frame and is confined against lengthwise movement on this arbor between a collar 42 on the inner end of the same and bars 43 secured to the outer end of the same by a screw nut 44, as best shown in Fig. 6. The reduced journals 45 and 54 at the rear ends of the rollers 21, 26 turn in bearings 46 and 47 formed in the upper part of the bracket 41. Between the bearings 46, 47, and the lower arbor 40 is arranged an intermediate horizontal arbor 48 which is connected at its inner end with the bracket 41 while its outer end is supported by an arm 49 secured by a bolt 50 to a boss 51 on the adjacent part of the bracket. On this intermediate arbor is journaled an intermediate gear pinion 52 which meshes on its underside with a driving gear pinion 53 on the inner end of the hub of the sprocket wheel 37; and on opposite sides of the center of its upper part this intermediate pinion meshes with driven gear pinions 56, 57 secured to the outer ends of the journals 45, 54 of the rollers 21, 26, as best shown in Figs. 4 and 6.

By this means the horizontal apron 13, lower elevator apron 17 and the clearing roller 26 are operated by power derived from the traction wheel 11. It will be noted that in this driving mechanism the chain belt 39 is wholly below the shield 31 and out of the path of the heads of the grain as they are carried upwardly through the throat 30 by the elevator aprons. This belt therefore cannot produce any threshing action on the heads of the grain nor interfere with the progress or position of the same as the grain is moved from the horizontal apron to the binder deck.

Furthermore the gearing transmitting motion from the chain belt 39 to the upper roller 21 of the lower apron and the clearing roller 26 operates without undue friction and with a minimum expenditure of power and also reduced wear compared with the mechanism heretofore employed for this purpose.

I claim as my invention:

1. A harvester comprising an inclined elevator apron, a delivery roller supporting the upper turn of said apron and provided with a driven gear pinion, a binder deck, a clearing roller arranged between said binder deck and delivery roller and provided with a driven gear pinion, a driving sprocket wheel having a driving gear pinion, and an intermediate gear pinion meshing on its underside with said driving gear pinion and on its upper side with said driven gear pinions on the delivery and clearing rollers.

2. A harvester comprising an inclined elevator apron, a delivery roller supporting the upper turn of said apron and provided with a driven gear pinion, a binder deck, a clearing roller arranged between said binder deck and delivery roller and provided with a driven gear pinion, a driving sprocket wheel having a driving gear pinion, an intermediate gear pinion meshing on its underside with said driving gear pinion and on its upper side with said driven gear pinions on the delivery and clearing rollers, a bracket provided with bearings for said delivery and clearing rollers, a lower arbor projecting outwardly from the lower part of said bracket and forming a bearing for said driving wheel and gear pinion, an intermediate arbor mounted at its inner end on said bracket and forming a journal for said intermediate pinion, and an arm supporting the outer end of said intermediate arbor and secured to the adjacent part of said bracket.

CHRISTIAN MAUL.